(No Model.) 4 Sheets—Sheet 2.

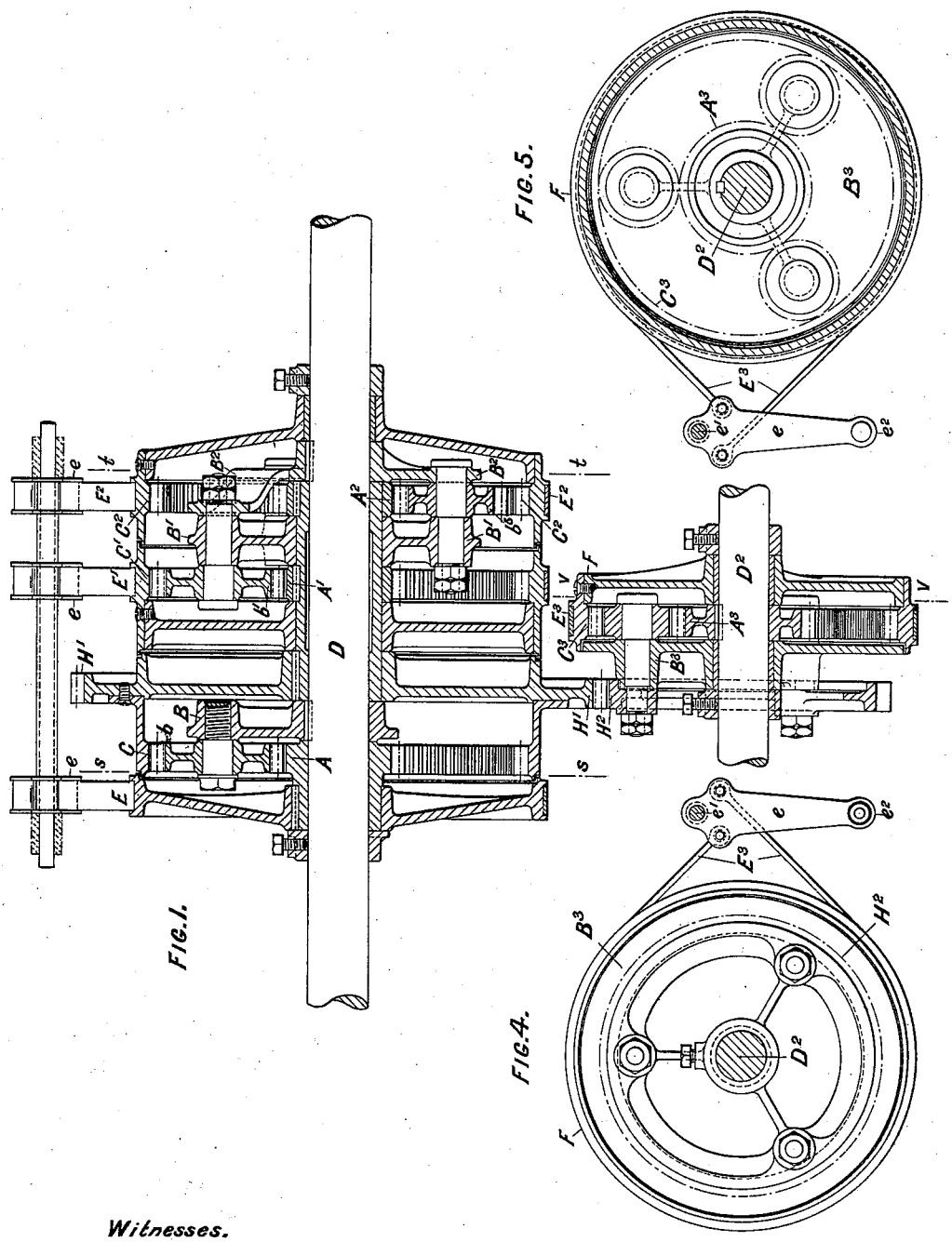

G. G. M. HARDINGHAM.
DIFFERENTIAL SPEED AND REVERSING GEAR FOR MOTOR CARS, TRAM CARS, &c.

No. 593,652. Patented Nov. 16, 1897.

Witnesses. Inventor.

(No Model.) 4 Sheets—Sheet 3.

G. G. M. HARDINGHAM.
DIFFERENTIAL SPEED AND REVERSING GEAR FOR MOTOR CARS, TRAM CARS, &c.

No. 593,652. Patented Nov. 16, 1897.

Witnesses.
Thos. P. Elam.
F. J. Rapson.

Inventor.
G. G. M. Hardingham (No Model.) 4 Sheets—Sheet 4.
G. G. M. HARDINGHAM.
DIFFERENTIAL SPEED AND REVERSING GEAR FOR MOTOR CARS, TRAM CARS, &c.
No. 593,652. Patented Nov. 16, 1897.
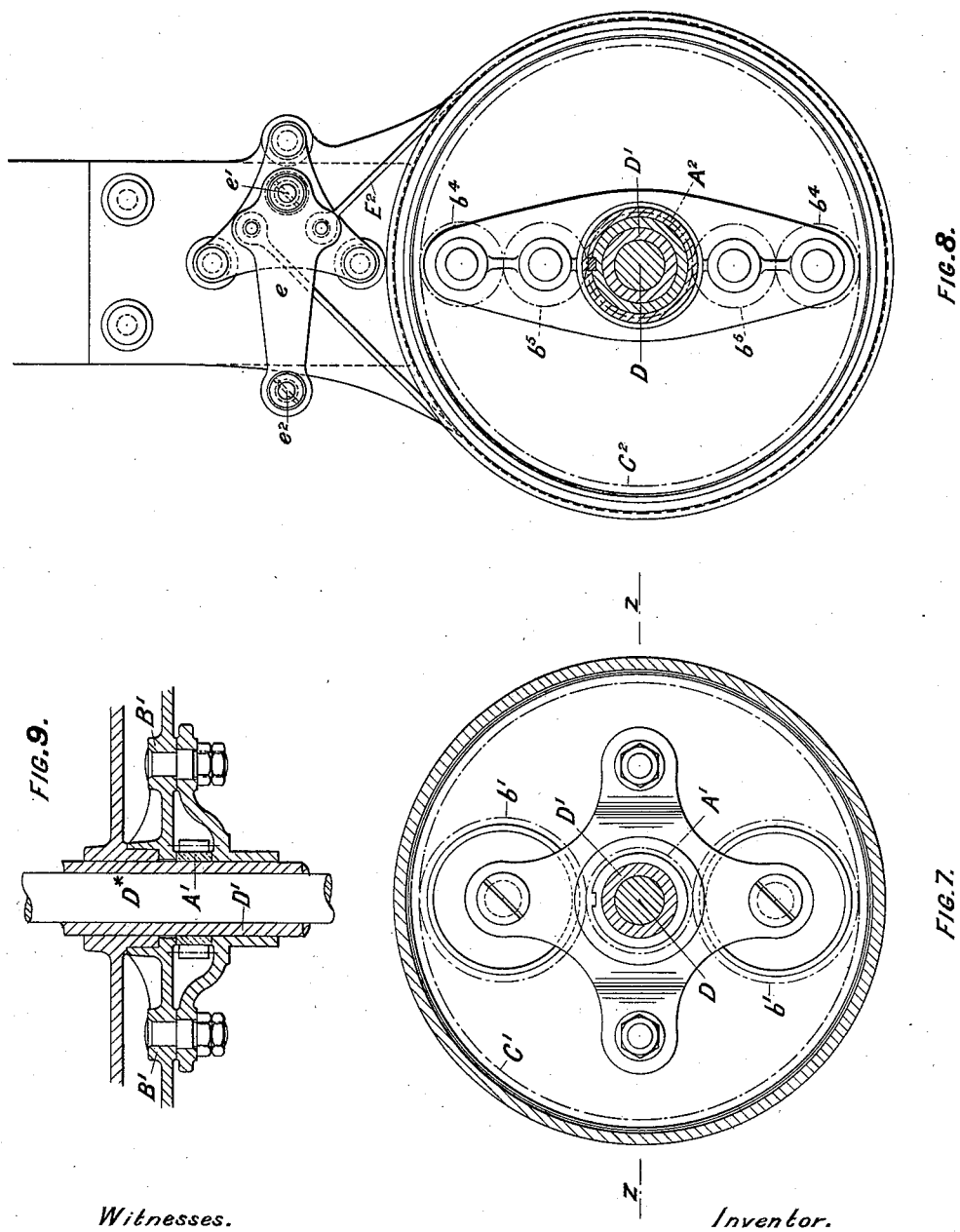
Witnesses.
Thos. P. Clam.
F. J. Rapson.
Inventor.
G. G. M. Hardingham

UNITED STATES PATENT OFFICE.

GEORGE G. M. HARDINGHAM, OF LONDON, ENGLAND.

DIFFERENTIAL SPEED AND REVERSING GEAR FOR MOTOR-CARS, TRAM-CARS, &c.

SPECIFICATION forming part of Letters Patent No. 593,652, dated November 16, 1897.

Application filed May 24, 1897. Serial No. 637,934. (No model.) Patented in England December 8, 1896, No. 28,100.

*To all whom it may concern:*

Be it known that I, GEORGE GATTON MELHUISH HARDINGHAM, a subject of the Queen of Great Britain and Ireland, residing at 191 Fleet Street, in the city and county of London, England, have invented certain new and useful Improvements in Differential Speed and Reversing Gears for Motor-Cars, Tram-Cars, Velocipedes, and other Road-Carriages, (in respect whereof I have applied for Letters Patent in Great Britain to bear date December 8, 1896, No. 28,100,) of which the following is a specification.

This invention relates to differential speed-gears of the kind in which epicyclic gear trains are employed; and it consists, first, in an improved mode of construction whereby two different speeds in one direction and one speed in the opposite direction are afforded, and, secondly, in improved means for effecting a large variation in speed between the motor or other driving-shaft and the change-gear.

Differential speed-gear constructed according to my improved method and adapted for enabling a motor-car or other road-carriage to be driven at two different speeds in one direction, and also to be driven in the reverse direction, is illustrated in the accompanying drawings, whereof—

Figure 3:
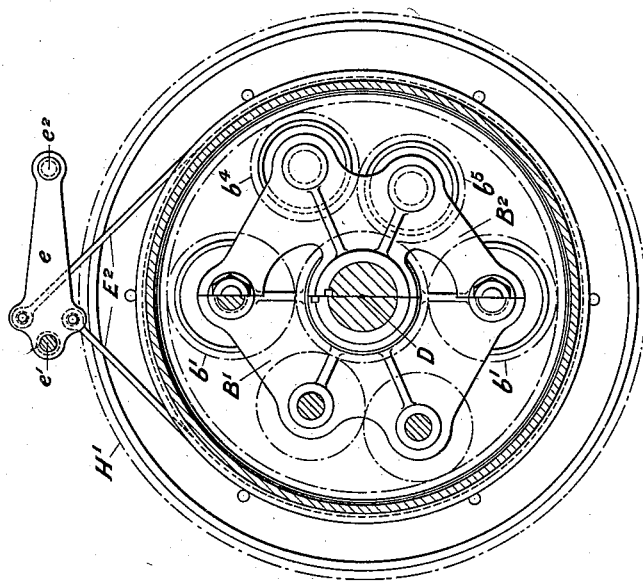
Figure 2:
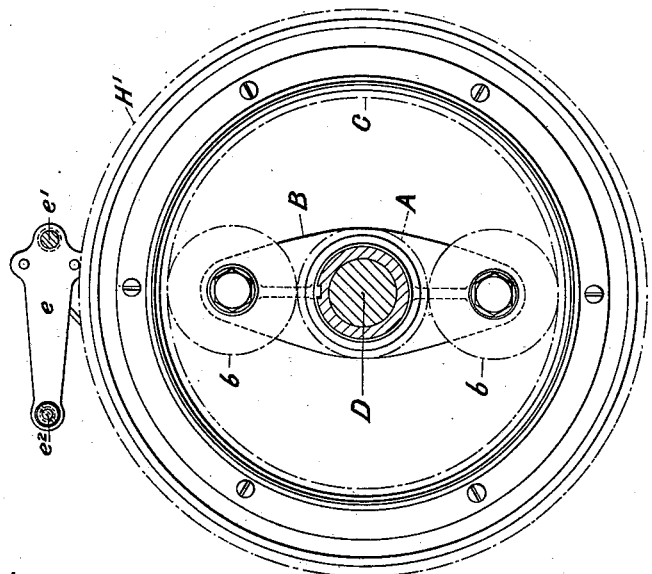
Figure 6:
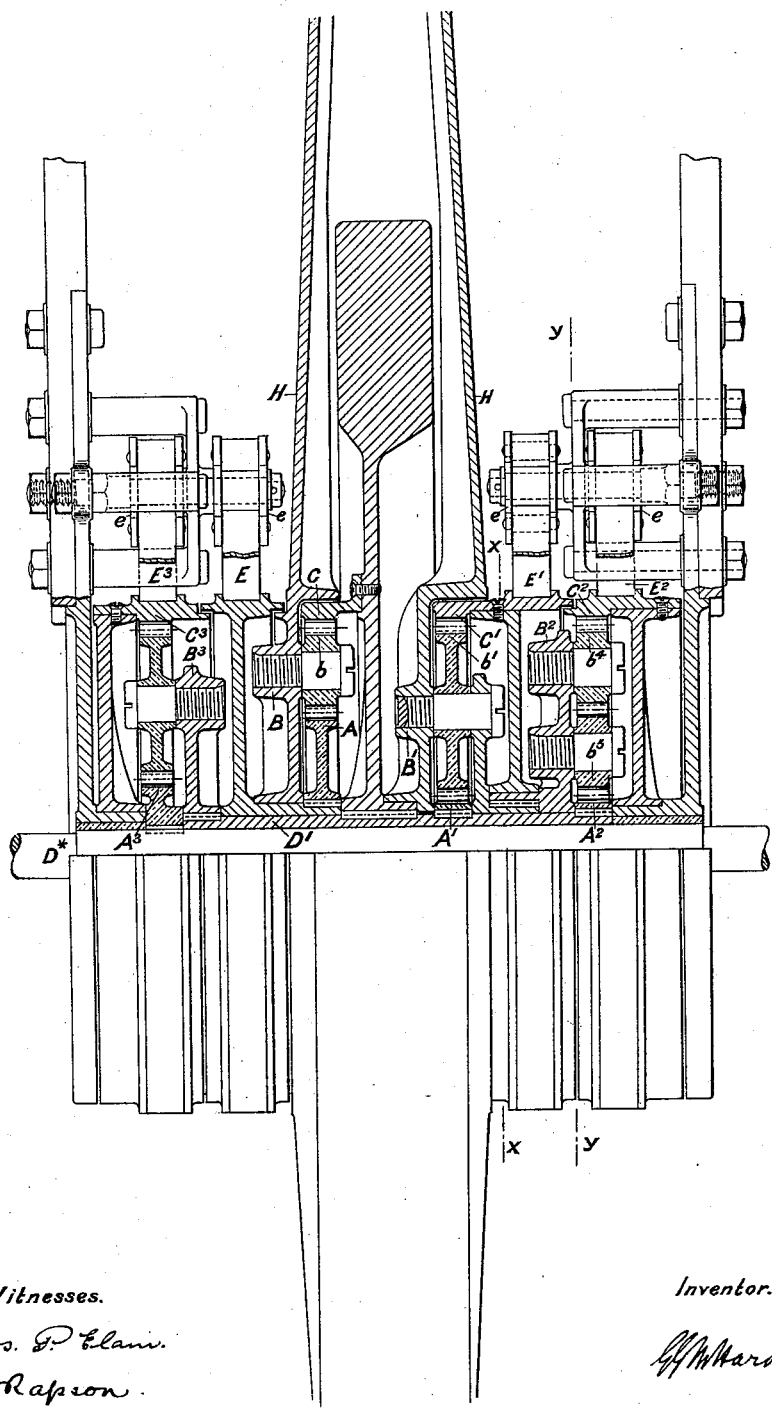

Figure 1 is a longitudinal section. Figs. 2 and 3 are sectional elevations on the lines $s\ s$ $t\ t$, Fig. 1, respectively. Fig. 4 is a side elevation of the speed-reducing gear, and Fig. 5 a sectional elevation thereof on the line $v\ v$, Fig. 1. Fig. 6 is a view, partly in elevation and partly in longitudinal section, of the gear arranged for applying the power axially, Figs. 7 and 8 being sectional elevations on the lines $x\ x\ y\ y$, Fig. 6, respectively, and Fig. 9 a fragmentary section on the line $z\ z$, Fig. 7.

The apparatus comprises three trains of spur-gear, one for the high speed, another for the low speed, and a third for the reverse speed. Each consists of a central pinion, a surrounding internally-toothed wheel, and an intermediate wheel, or a pair or set of intermediate wheels, carried on an axially-mounted body and gearing with the central pinion and with the outer wheel. One of the elements of each gear-train is, moreover, capable of being held stationary or of being released, according to whether such gear-train is required to be operative or inoperative.

Referring to the construction illustrated by Figs. 1 to 5, the manner in which the several elements of the respective gear-trains are connected with the source of power and with the shaft or other part to which motion is to be imparted is of the following character:

In the low-speed gear the central pinion $A'$ is connected with the spur-wheel $H'$ or source of motive power, the body $B'$, carrying the intermediate wheel or wheels $b'\ b'$, is secured to the shaft D by means of the auxiliary carrier $B^2$, (hereinafter further referred to,) and the outer wheel $C'$ is held stationary by a friction-strap $E'$ or other releasable device. In the high-speed gear the central pinion A is held stationary by a friction-strap E or other releasable device, the body B, carrying the intermediate wheel or wheels $b\ b$, is fast upon the shaft D, (wheel-hub or other part to which motion is to be imparted,) and the outer wheel C is connected with the spur-wheel $H'$, whence motion is to be derived. In the gear for driving in the reverse direction and at low speed the central pinion $A^2$ is in connection with the source of motive power $H'$, the intermediate wheel-carrier $B^2$ is fast upon the shaft D, (wheel-hub or other part to which motion is to be imparted,) and the outer wheel $C^2$ is held stationary by a friction-strap $E^2$ or other releasable device. In this last-mentioned case the intermediate wheels $b^4\ b^5$ are supported on opposite sides by the carriers B' $B^2$, which are bolted together, as shown in Fig. 1. The wheels $b^4\ b^5$ are arranged in pairs, as shown in Fig. 3, one of these, $b^4$, being mounted at a greater distance from the center than the other. While the former, $b^4$, meshes with the outer wheel $C^2$, the latter, $b^5$, meshes with the central pinion $A^2$, and the two wheels $b^4\ b^5$ mesh together.

Where a high-speed engine is employed, it is preferable to reduce the speed of rotation before applying the power to the change-gear, as compared with effecting a large reduction in the change-gear itself. For this purpose an epicyclic gear may be employed for transmitting the power from the motor-shaft to the change-gear, as shown in Fig. 1, $D^2$ being the motor or other driving shaft, to which is secured the pinion $A^3$. The intermediate wheels are carried on studs mounted in the disk B³, which latter carries a toothed ring or spur-pinion H² for engaging with the spur-wheel H'. The surrounding toothed wheel C³ may be permanently fixed or may be temporarily held by means of a friction-strap E³, as before described. In the latter case, upon the strap being slackened and the drum F released, the transmission of power from the motor to the change-gear is entirely interrupted.

When it is desired to apply the power of a high-speed engine axially instead of constructing each gear-train to afford a large reduction, I provide the shaft with a sleeve and mount the several gear-trains thereon, as illustrated in Figs. 6 to 9, the shaft being connected with the sleeve through reducing-gear of the epicyclic type. The driving power is in this instance applied axially and is transmitted from the shaft D* through the central pinion A³ to the intermediate wheel-carrier B³, the outer wheel C³ being fixed or held by means of the friction-strap E³. The motion imparted to the intermediate wheel-carrier B³ is communicated to the sleeve D', and thus to all three speed-gears. In the high-speed gear the central pinion A is held stationary by means of the friction-strap E, the intermediate wheel-carrier B is connected with or forms part of the road-wheel H, and the circumscribing toothed wheel C is secured to the sleeve D'. In the low-speed gear the central pinion A' is secured to the sleeve D', the intermediate wheel-carrier B' is connected with or forms part of the road-wheel H, and the outer wheel C' is held stationary by means of the friction-strap E'. In the gear for driving in the reverse direction the central pinion A² is connected with the sleeve D', the intermediate wheel-carrier B² is in connection through the intermediate wheel-carrier B' with the road-wheel H, and the outer wheel C² is held stationary by means of the friction-strap E².

Either of the triplex speed-gears hereinbefore described may be modified and converted into a duplex speed-gear by omitting the gear-train designed to drive in the reverse direction.

It will be observed that by employing reducing-gear arranged in either of the modes described with reference to Fig. 1 or Fig. 6 the increase or decrease of speed (as the case may be) accomplished by each gear-train may be kept within moderate limits, although the speed of the motor or other operating shaft may be relatively high. It will also be perceived that the differential speed-gear described with reference to Fig. 6 resembles in all essential particulars that described with reference to Fig. 1, except that in the one case the power is applied axially and yielded circumferentially, while in the other case the power is received circumferentially and yielded axially.

What I claim as my invention, and desire to secure by Letters Patent, is—

1. The improved duplex driving-gear, comprising two gear-trains, each consisting of three elements, namely, a central pinion, an intermediate wheel or set of intermediate wheels carried on an axially-mounted body, and a surrounding internally-toothed wheel, the intermediate wheel-carrier pertaining to each gear being connected with the driven part, the central pinion of the one gear and the outer wheel of the other gear being connected with the driving part, and holding devices for the outer wheel of the one gear and the central pinion of the other gear, whereby either the one gear or the other gear may be rendered operative or inoperative, substantially as herein described.

2. The improved triplex (duplex and reverse) driving-gear, comprising three gear-trains, each consisting of three elements, namely, a central pinion, an intermediate wheel or set of intermediate wheels carried on an axially-mounted body, and a surrounding internally-toothed wheel, the intermediate wheel-carriers of the first (high) and second (low) speed-gears being connected with the driven part, the outer wheel of the one gear and the central pinion of the other gear being connected with the driving part, and holding devices for the central pinion of the one gear and the outer wheel of the other gear, in combination with a gear having its elements connected in the same manner as the low-speed gear, the intermediate wheels of the third gear being duplicated and meshing with the central pinion and the outer wheel respectively and with one another, so as to reverse the direction of rotation, substantially as herein described.

3. The combination, with a change-gear mechanism, of speed-reducing gear comprising a motor or driving shaft D, a central pinion A³, connected with the said shaft, a sleeve D' in which the said shaft rotates and whereon the change-gear trains are mounted, an axially-mounted body B³ keyed on said sleeve, an intermediate wheel or set of intermediate wheels carried on the said body and a surrounding internally-toothed wheel C³ capable of being held stationary, the intermediate wheel or wheels meshing with the central pinion and with the surrounding internally-toothed wheel, substantially as herein described.

G. G. M. HARDINGHAM.

Witnesses:
F. J. RAPSON,
W. F. CAIN.